United States Patent Office 3,174,018
Patented Mar. 16, 1965

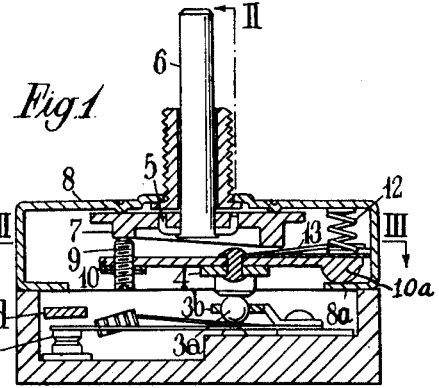
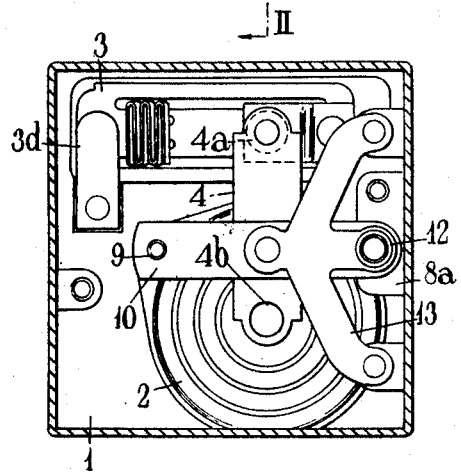
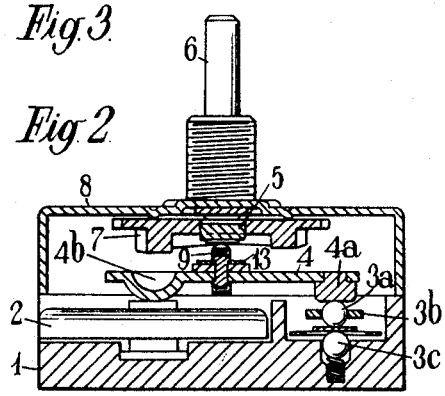

3,174,018
TEMPERATURE CONTROL SWITCH
George Ronald Shepherd and Ernest George David Clow, London, England, assignors to Diamond H. Controls Limited, London, England
Filed Mar. 22, 1963, Ser. No. 267,085
Claims priority, application Great Britain, Mar. 29, 1962, 12,166/62
5 Claims. (Cl. 200—140)

This invention relates to thermostats or temperature control switches suitable for the control of electric cookers and washing machines and other equipment.

It is an object of this invention to provide a thermostat capable of reliable and consistent performance methods, free from a multiplicity of complicated parts, pivots, and subsidiary levers, all of which add to cost and tend to produce erratic or unreliable performance.

The invention consists in a thermostat comprising a device having a moving part the position of which is dependent on the temperature of an object or region the temperature of which is to be controlled, a switch to be operated between two positions in accordance with the position of the moving part of said device, a device rockable about one axis in response to the movement of said moving part whereby to operate the switch, and rockable about a second axis inclined to the first to vary the position of said moving part at which the switch operation is produced.

Conveniently said rockable device is a cruciform device.

The invention will be further described with reference to the accompanying drawings:

FIGURE 1 is an axial section through the thermostat as assembled;

FIGURE 2 is a section on the line II—II of FIGURE 1; and

FIGURE 3 is a section on the line III—III of FIGURE 1.

In the drawings is shown a rectangular shaped base 1 in a circular recess of which is fitted a corrugated capsule 2 which is liquid filled and connectable by capillary tubing to a remote bulb (not shown) which is exposed to the heat of a region, the temperature of which is to be controlled.

In an adjacent recess of base 1 is fitted a conventional overcentre snap action switch 3 operable from a ball 3a, supported on an arm 3b secured to the base 1 against the resistance of a spring-loaded ball 3c located in the base 1. A back stop 3d is provided. Over capsule 2 and switch 3 there fits a rockable member 4. Over member 4, which may be stiff or slightly resilient to suit the characteristics of switch 3, is centrally located a dog 5 on the end of a spindle 6. Around the spindle is a circular cam track member 7 engaged by the dog 5. The spindle 6 passes out through a cover 8 fitting over the base 1 and incorporating a bearing bush for the spindle and a generally flat inner surface.

A screw 9 extends through one end of a strip 10 which is secured across the centre part, and at right angles to the length of, member 4. The tip of screw 9 engages with the cam surface of cam 7.

A compression spring 12 is fitted between the cover plate 8 and the other end of the strip 10 of the member 4 and presses the opposite side of strip 10, which is provided with a radiused surface 10a, against the inside of tab 8a at the centre of the bottom side of cover plate 8.

The assembly 4, 9, 10 is mounted on a Y-shaped leaf spring 13 having the ends of its arms anchored in the base 1 and the leg anchored to the member 4. This allows the rocking movements required while preventing unwanted movement of the assembly 4, 9, 10.

The operation of the thermostat is as follows:

Movements of the capsule 2, resulting from changes in the temperature being controlled, are produced at the rounded portion 4b of the member 4. These movements cause the assembly 4, 9 and 10 to rock, with one fulcrum at the tip of the calibration setting screw 9, and the other fulcrum at the radiused surface 10a, remote from the calibration setting screw 9.

Rocking of the assembly 4, 9 and 10 causes the switch 3 to be operated to the open position by the boss 4a of the member 4 or allowed to restore to the closed position.

Rotation of the cam 7 to other positions will vary the position of the tip of the calibration setting screw 9, thereby changing the height of one fulcrum for as assembly 4, 9 and 10 (rocking the assembly 4, 9, 10 about an axis extending through rounded portion 4b and the radiused surface 10a). The capsule 2 will have to expand to a greater or lesser extent to operate the switch, depending upon the position to which the cam 7 has been rotated, and thereby the temperature being controlled may be varied as desired.

The compression spring 12 permits the thermostat to be turned to its "Off" position after controlling at a high temperature without danger of overstressing the switch mechanism 3.

Whilst turning to "Off" the cam presses calibration setting screw 9 away from the cover 8. This causes the switch mechanism 3 to be pressed onto its limit-stop. The assembly, 4, 9 and 10 now rocks with one fulcrum at the tip of the calibration setting screw 9 and the other fulcrum on the end boss 4a. Continued pressure from the capsule 2 causes the end strip 10 to part from the portion 8a of the cover 8, the spring 12 being compressed during this action.

Various modifications may be made within the scope of the invention.

The materials from which the member 4 and strip 10 are made may be chosen, so that compensation would be provided by the member 4 or the strip 10. Compensation can also be provided by supporting the capsule 2 from the base by a bimetallic strip or spider.

In an alternative construction the whole of the spindle and cam mechanism could be replaced by an adjusting screw. The adjusting screw would replace the spindle 6, and rotation of this screw to various positions would vary the temperature being controlled.

The alternative described of an adjusting screw in place of the spindle and cam mechanism would require fewer components, but would not be so convenient for the user as it would not permit complete rotation of the spindle in either direction.

Instead of a capsule device, equivalent devices such as bellows, bimetallic strip, or bimetallic rod and tube may be used. Also the capsule may be operated by vapour pressure instead of hydraulically.

Any other form of mechanical or magnetic snap-action switch may be used, or a slow break switch without snap-action.

The cam 7 could be made by moulding, casting or hot pressing.

We claim:

1. A temperature control switch comprising a support, a moving part mounted therein the position of which is adapted to change in dependence on the temperature of an object or region the temperature of which is to be controlled, a self-restoring switch mounted within the support to be operated between two positions, a device mounted within the support in engagement with the moving part and the switch and so as to be rockable about one axis in response to the movement of said moving part whereby to operate the switch to one position, and rockable about a second axis inclined to the first to vary the position of said moving part at which the switch operation is produced and adjustable means mounted within the support for engaging said device to effect rocking about said second axis.

2. A temperature control switch as claimed in claim 1, in which the device is mounted within the support by means of a leaf spring which permits the rocking movements while preventing other undesirable movements.

3. A temperature control switch comprising a support, a moving part mounted therein the position of which is adapted to change in response to temperature of an object or region the temperature of which is to be controlled, a self-restoring switch mounted within the support to be operated between two positions, a device mounted within the support in engagement with the moving part and the switch so as to be rockable about one axis in response to the movement of said moving part whereby to operate the switch, and rockable about a second axis inclined to the first to vary the position of said moving part at which the switch operation is produced, one abutment adjustably mounted within the support for engaging said device to effect rocking about said second axis when its position is adjusted and defining one end of said first axis and a further abutment mounted within the support so as to yieldably engage said device and defining the other end of said first axis.

4. A temperature control switch as claimed in claim 3, in which said second axis is defined by said further abutment at one end and by the point of engagement of the moving part with the device at the other end.

5. A temperature control switch as claimed in claim 3, comprising means mounted within the support for limiting the movement of the switch in its operation to said one position whereby further movement of said moving part causes said further abutment to yield, said device rocking about a third axis defined at one end by the point of engagement of the device and the switch and at the other end by the point of engagement of said one abutment and the device.

References Cited by the Examiner
UNITED STATES PATENTS
2,773,147   12/56   Judson _____ 200—83

BERNARD A. GILHEANY, *Primary Examiner.*